United States Patent [19]

Harris

[11] Patent Number: 4,513,599
[45] Date of Patent: Apr. 30, 1985

[54] STEEL MILL EDGER DRIVE SYSTEM

[75] Inventor: Thomas E. Harris, Point Claire, Canada

[73] Assignee: Dominion Engineering Works Limited, Lachine, Canada

[21] Appl. No.: 532,260

[22] Filed: Sep. 15, 1983

[30] Foreign Application Priority Data

Sep. 30, 1982 [CA] Canada ................................. 412581

[51] Int. Cl.³ .............................................. B21B 31/08
[52] U.S. Cl. ........................................ 72/238; 72/249; 72/449; 74/606 R
[58] Field of Search ................. 72/238, 237, 249, 481, 72/449; 74/606 R

[56] References Cited

U.S. PATENT DOCUMENTS 3,636,909  1/1972  Benson, Jr. ...................... 74/606 R
4,389,865  6/1983  Davies ................................. 72/249

Primary Examiner—Lowell A. Larson
Assistant Examiner—Jorji M. Griffin
Attorney, Agent, or Firm—Suzanne Kikel

[57] ABSTRACT

A modular unit for mounting in a mill, which unit has a housing containing a pinion fixed to a shaft with a drive gear extending from the housing. The housing partially encircles the periphery of the pinion and has an upper member for mounting a thrust bearing on one end of the shaft and a lower capsule plate element mounting another bearing opposite the thrust bearing, which plate is snugly received in an aperture in the mill through which the drive gear passes. The modular unit is secured to the mill along at least two planes in a manner to completely enclose the pinion and gear and to permit disassembly thereof through axial and radial movements of the unit relative to the axis of the shaft.

6 Claims, 2 Drawing Figures

STEEL MILL EDGER DRIVE SYSTEM

FIELD OF THE INVENTION

The present invention relates to a steel mill edger drive, more particularly the present invention relates to a modular unit to facilitate assembly and disassembly of at least a portion of the drive to each of the edger rolls.

BACKGROUND OF THE INVENTION

The edger system of a plate mill for rolling plate steel generally includes rougher rolls which rotate about a pair of vertically spaced horizontal axes, coupled with a pair of edger rolls that rotate about a pair of horizontally spaced vertical axes. The rougher rolls reduce the thickness of the steel plates while the edger rolls work on the edges of the plate to keep them square and/or control plate width. Obviously both the rougher rolls and the edger rolls are adapted to move closer together or further apart, depending on the thickness and width of the plate being rolled and all of these rolls must be driven in order to feed the plate therethrough.

The drive to the vertical edger rolls usually will include a main drive shaft, extending across the machine, i.e. substantially horizontally, which is geared to two pinion shafts that extend vertically, there being one pinion shaft for each edger roll. A pinion is mounted to rotate with each pinion shaft and each such pinion is adapted to cooperate with the bull gear that in turn is coupled to drive one of the edger rolls.

The manner in which the bull gear is coupled to its respective edger roll depends on the type of drive mechanism employed which in turn is dependent on the manner in which the relative position of the two edger rolls is adjusted. In some cases the bull gear shaft is connected to the edger roll and the positions of the edger rolls are adjusted by rotating the bull gears about the axes of the pinion shafts thereby to move the two edger rolls toward and away from each other.

In another type of drive the bull gear is hollow and is fixed. A shaft passes up through and is coupled to the top end of the bull gear via a universal joint. The opposite end of the drive shaft is coupled to an edger roll by means of a second universal joint. The clearance between the shaft and the inside of the bull gear provides clearance to permit movement of the drive shaft when the adjusting mechanism of the edge rolls shifts the position of the edge rolls (in this type of mechanism generally upper and lower ends of the edger rolls are received within the bearings and the positions of these bearings are adjustable by some jacking means such as screw jacks and the like).

In each of the above drive systems one of the key elements is the pinion shaft with its pinion and driving gear, the driving gear usually being a bevel gear cooperating with a bevelled gear on the transversed main drive shaft of the machine. The diameter of the bevel gear is larger than the diameter of the pinion and thus vertical movement of the pinion shaft with the bevel gear attached result in the bevelled gear moving toward the underside of the bull gear and this poses limitations in the manner in which the housing mounting of the pinion shaft has been constructed to permit withdrawl of the pinion shaft.

One design requires that the whole upper drive unit, i.e. the pinion, bull gear, bevel gear, pinion shaft and the upper housing including the top of the main casing be lifted as a unit so that the whole mechanism may be lifted vertically. The upper housing is unbolted from the bottom casing, the bull gears disconnected from the edger rolls and then the whole unit, including the upper housing top plate of the main casing bull gears, etc. is lifted vertically until the bevel gears clear the bottom casing and then transported to the desired location. This assembly is quite heavy and could be in the order of 500,000 pounds, and a very large (high lifting capacity) crane is required to move the assembly.

In an alternative arrangement the upper housing is made relatively large and both the upper thrust bearing and the intermediate bearing are contained in their respective capsules which are rigidly interconnected. The upper capsule containing the thrust bearing is securely fixed to the top of the upper housing. To dismantle or assemble such a structure it is necessary to free the upper capsule and then lift the assembly formed by the pinion shaft and its connected gears as well as the upper and lower capsules vertically to clear the capsules from the apertures in the housing. These capsules are each slightly larger in diameter than the bevelled gear and are offset relative to the axis of the pinion shaft and when lifted open passages through which the bevel gear may pass. After the capsules have cleared their openings the assembly is first shifted laterally to align the bevel gear with the lower opening, is then lifted again to move the bevel gear through the lower opening, then laterally so that the bevel gear clears the bull gear, then vertically to lift the bevel gear above the bull gear, then laterally to align the bevel gear with the upper opening, then vertically to pass the bevel gear through the upper opening and thereby free the assembly from the housing. This arrangement permits handling of only one pinion shaft assembly including the pinion shaft and its connected gearing, bearings and capsules rather than the whole assembly including both pinion shaft assemblies and their respective bull gear upper housing, etc.

It will be apparent that with the later structure a significant height must be available above the drive to accommodate the length of the pinion shaft above the top of the housing. It sometimes requires the addition of several feet to the height of the building which obviously would be a very costly addition to the capital cost of the mill.

Furthermore, the size of the bottom and top capsule and the requirement to shift the unit laterally, i.e. in a horizontal direction, to clear the bull gear within the housing, extends the dimensions of the housing and increases the clearance normally required between the rougher rolls and edger rolls.

BRIEF DESCRIPTION OF THE PRESENT INVENTION

It is an object of the present invention to provide a modular unit to facilitate assembly and disassembly of the pinion and bevel gear from the drive to the edger rolls of a steel mill.

Broadly the present invention relates to an improved steel mill edger drive modular unit composed of a housing, a shaft, a drive gear fixed to the shaft, a pinion fixed to rotate with said shaft, a thrust bearing from said shaft on the side of said pinion remote from said drive gear, a bearing for said shaft, intermediate said pinion and drive gear, a housing having a housing portion partially encircling the periphery of said pinion and having an upper bearing mount for mounting said thrust bearing and a lower capsule element mounting said bearing, said capsule element being adapted to be snugly received in a mating aperture sufficiently large to pass said drive gear therethrough formed in a main machine casing, said housing being adapted to be secured to said main machine casing along at least two angularly related planes, said plane being oriented in a manner to permit movement of the unit axially of the shaft and then substantially radially of the shaft to permit disengagement of teeth on said pinion and removal of the drive gear through the aperture in the main casing. Preferably one of said planes will be substantially parallel to the rotational axis of said shaft.

BRIEF DESCRIPTION OF THE DRAWINGS

Further features objects and advantages will be evident from the following detailed description of the preferred embodiment of the present invention taken in conjunction with the accompanying drawings in which.

The present invention is applied to an edger roll drive mechanism wherein the bull gear cooperating with the pinion rotates about a fixed vertical axis and is coupled to the edger roll via a drive shaft that is mounted at one end of the bull gear via a universal joint and at its other end is connected to the edger roll to drive same through a second universal joint so that the position of the edger roll may be shifted relative to the bull gear by shifting the drive shaft around the univeral joints and still be driven by the bull gear. Obviously the drive shaft must be capable of axial extension in order to accommodate the different distances between the vertical edger roll and the bull gear in the various adjusted position.

Figure 1:
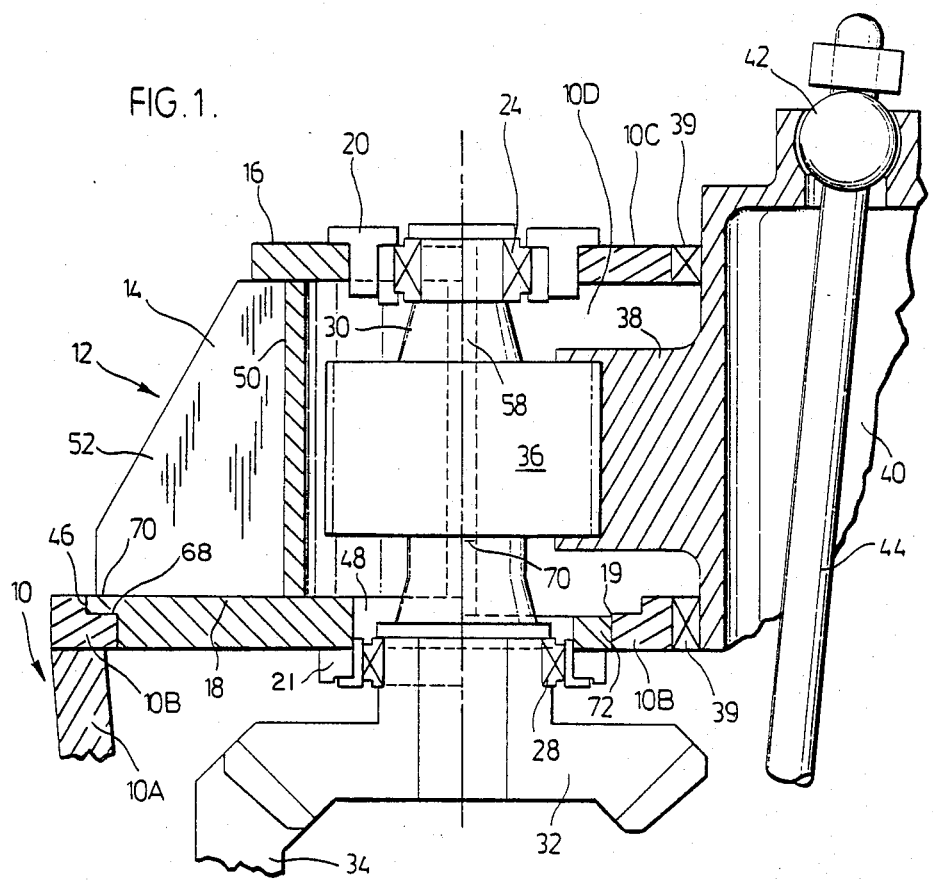
- FIG. 1 is a partial section view illustrating the module of the present invention with the drive gear and pinion of the module in cooperation with a driving gear and a bull gear.

In the view shown in FIG. 1 only that part of the apparatus incorporating the present invention has been illustrated. However, generally the present invention will be applied to a main housing casing generally indicated at 10, formed by a vertical wall portion 10A a horizontal supporting plate 10B and an upper horizontal section 10C. The plate 10B is welded to the vertical wall 10A and is connected to the section 10C by an upper vertical wall section generally indicated at 10D in FIG. 1.

The module of the present invention is generally indicated at 12 and is composed of a housing unit 14 having a bearing mount 16 at its upper end and a bottom capsule 18 at its lower end. The capsule 18 is snugly received in an aperture 19 formed in the horizontal support wall 10B, of casing 10. Suitable bearing supports 20 and 21 are fixed to the elements 16 and 18 respectively to mount the thrust bearing 24 and the shaft bearing 28 respectively for the pinion shaft 30.

Mounted at the bottom end of the pinion shaft 30 is a bevel drive gear 32 which mates with a similar bevel driving gear schematically indicated at 34 which is fixed to the main edger drive shaft (not shown) of the machine and delivers power through gear 32 and shaft 30 to the pinion 36 which is fixed to rotate with the pinion shaft 30.

The pinion 36 mates with a bull gear 38 which has a hollow interior as indicated at 40. The bull gear 38 is mounted for rotation in the main casing 10 by bearings generally indicated at 39 in horizontal housing members 10B and 10C, i.e. about a fixed substantially vertical axis.

At the upper end of the bull gear 38 is a universal coupling 42 which connects a shaft 44 with the bull gear 38. The bottom end of the shaft 44 is coupled to an edger roll via a universal joint (not shown). At least one of the universal joint and/or the shaft 44 will be provided with means to permit axial extension of the shaft 44 to accommodate the different positions of the edger roll as it is adjusted.

Figure 2:
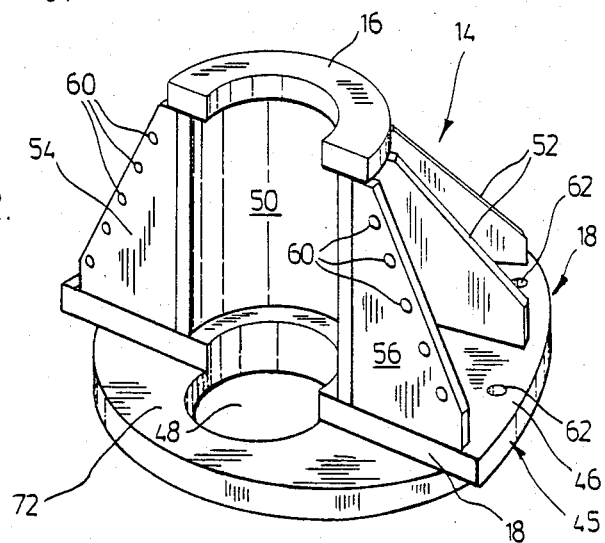
FIG. 2 is a isometric view of the housing for the module.

Referring to FIG. 2 the housing structure 14 is shown in isolation. It will be noted that the housing is composed of an upper bearing mounting 16 and lower capsule 18. The capsule has a substantially circular lower plug element 45 having in the illustrated arrangement an upper bolting flange plate 46 integral therewith and projecting laterally therefrom around the major portion of the periphery of the capsule 18. An aperture 48 eccentric with the centre of the capsule 18 is provided as indicated at 48 extending through the capsule 18. This aperture 48 is adapted to receive the pinion shaft bearing 28.

A rigid curved plate member 50 partially encircles the aperture 48 and extends from the plate 46 to the bearing support or mounting 16 and provides a compartment adapted to receive the pinion 36. Suitable reinforcing webs generally indicated at 52 extend between the capsule 18 and bearing mounting 16 and are secured to these members as well as to the plate member 50 thereby to provide a relatively rigid housing structure.

The end webs 54 and 56 at the end edges of the curved member 50 are adapted to be connected to substantially vertical spaced apart flanges 58 (indicated by dotted lines in FIG. 1) fixed to and forming part of casing 10 via suitable studs passing through bolt holes 60 in the webs 54 and 56 and threaded into the flange 58 to close the casing 10. Each of the flanges 58 interconnect the horizontal members 10B and 10C and extend inward toward the pinion shaft 30 from the upper vertical wall 10D and provide one face at a separation line or plane substantially parallel to the axis of rotation of the shaft 30.

The flange 46 may be secured to the main casing 10 in any suitable manner preferably by studs (not shown) passing through holes 62 (see FIG. 2) and threaded into suitable holes formed in plate 10B. It will be noted that the capsule 18 is fitted into aperture 19 in the wall 10B of the housing 10 preferably is supported on a ledge 64 formed on the inner face of the aperture 19. This ledge constituting a separation plane disposed perpendicularly to the plane formed by the flanges 58.

It will be apparent that clearance must be maintained for the bevel gear 32 within the casing 10 thus the side walls 10D of the casing must be located to provide such clearance and to permit the bevel gear 32 to be aligned with the aperture 19 for dismantling or assembly. It will be noted that the axis of rotation of the pinion shaft 30 (and thus aperture 48 in capsule 18) is eccentric to the centre of capsule 18 and thus eccentric to the aperture 19 in which plug portion 45 of capsule 18 is received when the unit is assembled on casing 10.

In operation to move the pinion 36 and bevel gear 32 it is necessary only to disconnect the element 14 from the housing 10 by disconnecting the bolts or studs (not shown) extending through the holes 60 and 62 and to free the bearing mount 20 from the housing 10C. The unit as a whole may now be lifted vertically along a separation plane defined by the mating faces of the end webs 54 and 56 with those of the flanges 58 of the housing 10. The housing segment 14 and pinion shaft 30 together with bevel gear 32 are lifted as a unit with suitable lifting means connected at appropriate locations to hold the unit substantially vertical.

After the unit has been disconnected from the frame 10 it is lifted vertically to clear the gear 34 and so that the capsule 18 is above the upper surface 68 of the top plate 10B of housing 10. It will be noted that the flanges 58 forming part of the housing 10 are cut away as indicated at 70 and that the capsule 18 is also cut away by about the thickness of the flange 46 to provide a projecting portion 72 of plug 45 extending out from the curved plate member 50 and flanges 54 and 56 to permit this lift.

At this point the projecting portion 72 of plug 45 of the capsule 18 approaches the bull gear 38 and clears the aperture 19 and the bevel gear 32 approaches the frame portion 10B adjacent the lower bearing 39 of the bull gear 38 and clears the mating gear 34.

With the gear 32 clear of the gear 34 and the capsule 18 clear of apertures 19 in plate 10B the unit may be now shifted to the left in FIG. 1 to align the bevel gear 32 with the aperture 19 formed by removal of the capsule 18 from the casing 10, i.e. the area of the plug portion 45 of the capsule 18 and thus of aperture 19 will be slightly larger than the bevel gear 32 so that the bevel gear 32 may pass up through the opening 19 formed through the casing 10 by removal of the capsule 18. The lateral movement must be in a direction to freely disengage the teeth of the pinion 36 from those of the bull gear 38 which requires proper positioning and orientation of the flanges 58 relative to the pinion 36. The unit is then again lifted vertically until the bevel gear 32 approaches the bull gear 38 and is positioned above the top plate 10B of the casing 10. The unit is then shifted laterally clear of the casing 10 e.g. to the left in FIG. 1 and is completely free of the remainder of the drive.

It will be noted with this operation the required lifting height is limited to the distance between the bottom edge of the bevel gear 32 and the top edge 68 of the frame 10B. Furthermore, the top casing need not be extended to accommodate lateral movement of the bevel gear around the bull gear which permits narrowing of casing 10 which, in some cases, permits closer coupling of the rougher rolls to the edger rolls.

Modifications will be evident to those skilled in the art without departing from the spirit of the invention as defined in the appended claims.

What I claim as new and desire to secure by Letters Patent of the United States is:

1. In a drive modular unit for a roll of a steel mill edger, wherein said mill has a main casing and the roll is driven by a bullgear, said drive modular unit comprising:
   a housing,
   a shaft extending through said housing,
   a pinion fixed to said shaft for engagement with said bullgear.
   a drive gear fixed to said shaft on one side of said pinion,
   a thrust bearing for said shaft on the side of said pinion remote from said drive gear, and
   a bearing for said shaft intermediate said pinion and drive gear,
   said two bearings being mounted in said housing,
   said housing having a portion partially encircling the periphery of said pinion rigidly interconnected to an upper bearing mount for mounting said thrust bearing and a lower capsule element mounting said bearing intermediate said pinion and drive gear,
   said shaft having an axis of rotation eccentric to the center of said lower capsule,
   said capsule constructed and arranged to be received in said mating aperture in said main casing,
   said housing further constructed and arranged to be secured to said casing along at least two angularly related separation planes oriented in a manner to permit movement of said drive modular unit axially of said shaft and then substantially radially to permit disengagement of said pinion from said bullgear and removal of said drive unit out of said main casing.

2. A modular unit as defined in claim 1, wherein one of said separation planes is arranged substantially parallel to the rotational axis of said shaft.

3. A modular unit as defined in claim 2, wherein the other of said separation planes is arranged at a right angle to said parallel separation plane and said rotational axis of said shaft.

4. A modular unit as defined in claim 3 wherein said rotational axis is substantially vertical.

5. A modular unit as defined in claim 2 wherein said rotational axis is substantially vertical.

6. A modular unit as defined in claim 1, wherein said eccentric relationship between said shaft axis and the center of said lower capsule is such that the center of the lower capsule is offset in a direction away from said main casing in a manner to allow said radial movement of said unit.

* * * * *